US011096144B2

(12) United States Patent
Bendlin et al.

(10) Patent No.: US 11,096,144 B2
(45) Date of Patent: Aug. 17, 2021

(54) PAGING AN IDLE SUBSCRIBER IDENTITY MODULE USING A CONNECTED SUBSCRIBER IDENTITY MODULE OPERATING IN A SINGLE RADIO CONFIGURATION FOR 5G OR OTHER NEXT GENERATION WIRELESS NETWORK

(71) Applicant: AT&T Intellectual Property I, L.P., Atlanta, GA (US)

(72) Inventors: Ralf Bendlin, Cedar Park, TX (US); Arunabha Ghosh, Austin, TX (US); Thomas Novlan, Cedar Park, TX (US); Milap Majmundar, Austin, TX (US); Xiaoyi Wang, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/777,378

(22) Filed: Jan. 30, 2020

(65) Prior Publication Data

US 2021/0105738 A1 Apr. 8, 2021

Related U.S. Application Data

(60) Provisional application No. 62/910,748, filed on Oct. 4, 2019.

(51) Int. Cl.
*H04W 68/00* (2009.01)
*H04W 76/27* (2018.01)
(Continued)

(52) U.S. Cl.
CPC ......... *H04W 68/005* (2013.01); *H04W 8/183* (2013.01); *H04W 8/24* (2013.01); *H04W 76/27* (2018.02)

(58) Field of Classification Search
CPC ..... H04W 68/02; H04W 76/27; H04W 88/06; H04W 76/15; H04W 76/16; H04W 88/02;
(Continued)

(56) References Cited

U.S. PATENT DOCUMENTS 10,548,181 B2  1/2020  Siomina et al.
2013/0188543 A1  7/2013  Dwyer et al.
(Continued)

OTHER PUBLICATIONS

3GPP TS 38.331 Radio Resource Control (RRC) protocol specification v15.6.0. 516 Pages.
(Continued)

*Primary Examiner* — Gary Lafontant
(74) *Attorney, Agent, or Firm* — Amin, Turocy & Watson, LLP

(57) ABSTRACT

Various embodiments disclosed that describe systems to facilitate paging an idle subscriber identity module using a connected subscriber identity module operating in a single radio configuration. According to some embodiments, a system can comprise receiving a paging request that is designated for a first device of a communication device, wherein the communication device comprises the first device and a second device; determining whether the second device is in an active state; and in response to the determining that the second device is in the active state, transmitting a message to second device indicating that the paging message was received for the first device.

20 Claims, 14 Drawing Sheets

(51) Int. Cl.
*H04W 8/24* (2009.01)
*H04W 8/18* (2009.01)

(58) Field of Classification Search
CPC ..... H04W 60/005; H04W 68/12; H04W 8/18;
H04W 36/0066; H04W 36/0069; H04W
48/18
See application file for complete search history.

(56) References Cited

U.S. PATENT DOCUMENTS

| | | |
|---|---|---|
| 2013/0194941 A1 | 8/2013 | Lu et al. |
| 2013/0267261 A1* | 10/2013 | Nikkelen .............. H04W 68/00 455/458 |
| 2015/0092630 A1 | 4/2015 | Lin et al. |
| 2015/0180514 A1 | 6/2015 | Pavacic et al. |
| 2015/0105120 A1 | 8/2015 | Lim |
| 2015/0255858 A1 | 9/2015 | Li et al. |
| 2017/0094568 A1 | 3/2017 | Yang et al. |
| 2019/0132090 A1 | 5/2019 | Khameneh et al. |
| 2019/0166475 A1 | 5/2019 | Nanakandiyil et al. |
| 2019/0174436 A1 | 6/2019 | da Silva et al. |
| 2020/0092685 A1 | 3/2020 | Fehrenbach et al. |
| 2020/0245292 A1* | 7/2020 | Huang .............. H04M 1/72522 |

OTHER PUBLICATIONS

Notice of Allowance received for U.S. Appl. No. 16/796,352 dated Mar. 31, 2020, 34 pages.
Non-Final Office Action received for U.S. Appl. No. 16/789,076 dated Jun. 24, 2021, 25 pages.

* cited by examiner

PAGING AN IDLE SUBSCRIBER IDENTITY MODULE USING A CONNECTED SUBSCRIBER IDENTITY MODULE OPERATING IN A SINGLE RADIO CONFIGURATION FOR 5G OR OTHER NEXT GENERATION WIRELESS NETWORK

RELATED APPLICATION

The subject patent application claims priority to U.S. Provisional Patent Application No. 62/910,748, filed Oct. 4, 2019, and entitled "PAGING AN IDLE SUBSCRIBER IDENTITY MODULE USING A CONNECTED SUBSCRIBER IDENTITY MODULE OPERATING IN A SINGLE RADIO CONFIGURATION FOR 5G OR OTHER NEXT GENERATION WIRELESS NETWORK," the entirety of which application is hereby incorporated by reference herein.

TECHNICAL FIELD

This disclosure relates generally to management of paging multiple subscriber identity module (SIM) that share a single radio in wireless network. More specifically, facilitating paging an idle subscriber identity module using a connected subscriber identity module operating in a single radio configuration, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. 5G research and development also aims to provide and use smartphones that are equipped with two or more SIMs to allow more flexibility for the subscriber. For example, a subscriber may use a first SIM for a personal or private line and a second SIM for a work provided line. Alternatively, a subscriber may use a first SIM for voice only and a second SIM for data or data and voice to avoid data roaming charges. A subscriber may use a first voice only SIM from an operator in a country of residence to receive phone calls and short message services (SMS) also known as text messages, whereas use a second SIM provided by a foreign operator abroad for data services. This way, the subscriber can be reached under their known home phone number when friends or family text and call them, however, data roaming charges which are commonly very expensive can be avoided. In yet another example, a subscriber may be a first responder, armed services member, firefighter, law enforcement officer, federal or state user and alike who must connect to a dedicated public safety core network (CN) separate from traditional core networks for commercial usage. The first responder, armed services member, firefighter, law enforcement officer, federal or state user and alike may want to additionally use the same device provisioned for a public safety use case for private use. This is similar to the first example above, however, in this case, a first SIM is used to establish connections to a first core network (e.g., one dedicated to a public service use case) whereas a second SIM is used to establish connections to a second commercial core network.

In another example, a subscriber unit may also be a machine as in the realm of machine-type communications (MTC) otherwise known as the Internet-of-Things (IoT). For example, a connected car may use a first SIM for safety and security services and a second SIM for infotainment applications. The safety and security purposes may include automatic crash response services that use built-in sensors to automatically connect to a human after a collision to assist in emergencies, emergency and crisis services during severe weather and natural disasters, roadside assistance and stolen vehicle assistance. The infotainment services may include local Wi-Fi hotspots via cellular connections and other data services, e.g., to stream music, mapping information for turn-by-turn navigation and so forth. In this use case, the first SIM for safety and security purposes may be provisioned by the car manufacturer or other company providing the service, whereas the second SIM for infotainment applications may be purchased by the end user on the open marketplace.

The above-described background relating to relating use of dual SIMs using a single radio is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
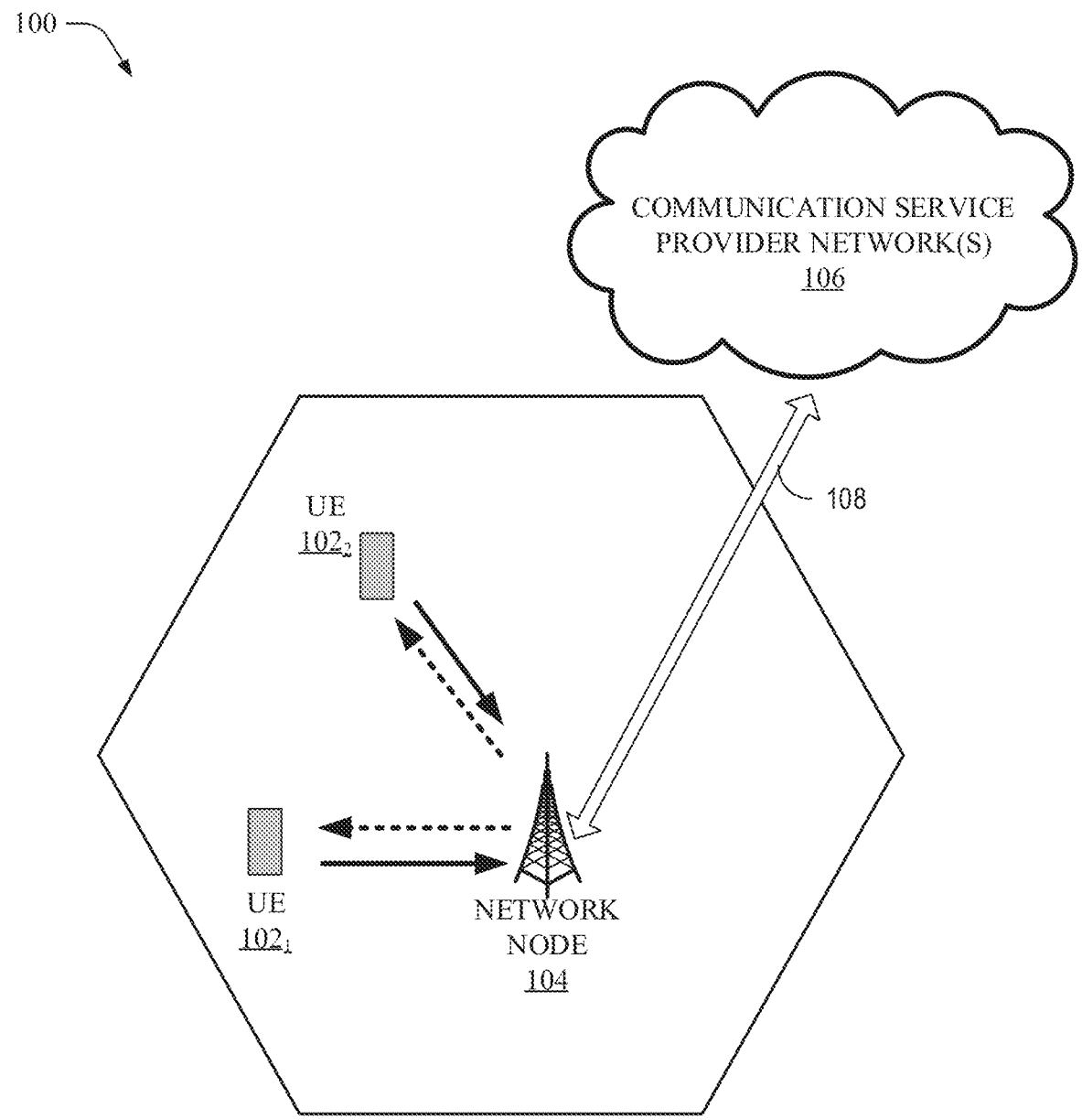
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate paging an idle subscriber identity module using a connected subscriber identity module operating in a single radio configuration. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or other LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate paging an idle subscriber identity module using a connected subscriber identity module operating in a single radio configuration. Facilitating paging an idle subscriber identity module using a connected subscriber identity module operating in a single radio configuration can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB or eNodeB), next generation Node B (gNB or gNodeB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller (e.g., controller, central controller, or centralized unit) that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

According an embodiment, a system can comprise a processor and a memory that stores executable instructions that, when executed by the processor, facilitate performance of operations comprising receiving a paging request that is designated for a first device of a communication device, wherein the communication device comprises the first device and a second device. The operations can further determining whether the second device is in an active state. The operations can further in response to the determining that the second device is in the active state, transmitting a message to the second device indicating that the paging request was received that is designated for the first device.

According to another embodiment, described herein is a method that can comprise receiving, by a device comprising a processor, a paging request that is addressed to a first device of a wireless communication device, wherein the wireless communication device comprises the first device and a second device. The method can further comprise determining, by the device, whether the second device is communicatively connected to a network node device. The method can further comprise in response to the determining that the second device is communicatively connected to the network node, transmitting, by the device, a message to the second device indicating that the paging request was received that is addressed to the first device.

According to yet another embodiment, a device can comprise a processor and a memory that stores executable instructions that, when executed by the processor, facilitate performance of operations comprising receiving a paging message addressed to a first device of a communication device, wherein the communication device comprises the first device and a second device. The device can further comprise determining and the second device is communicatively connected to a network node device. The device can further comprise in response to the determining that the second device is communicatively connected to the network node device, transmitting an alert message to the second device indicating that the paging message was received, wherein the paging message is addressed to the first device.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment (UE) can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
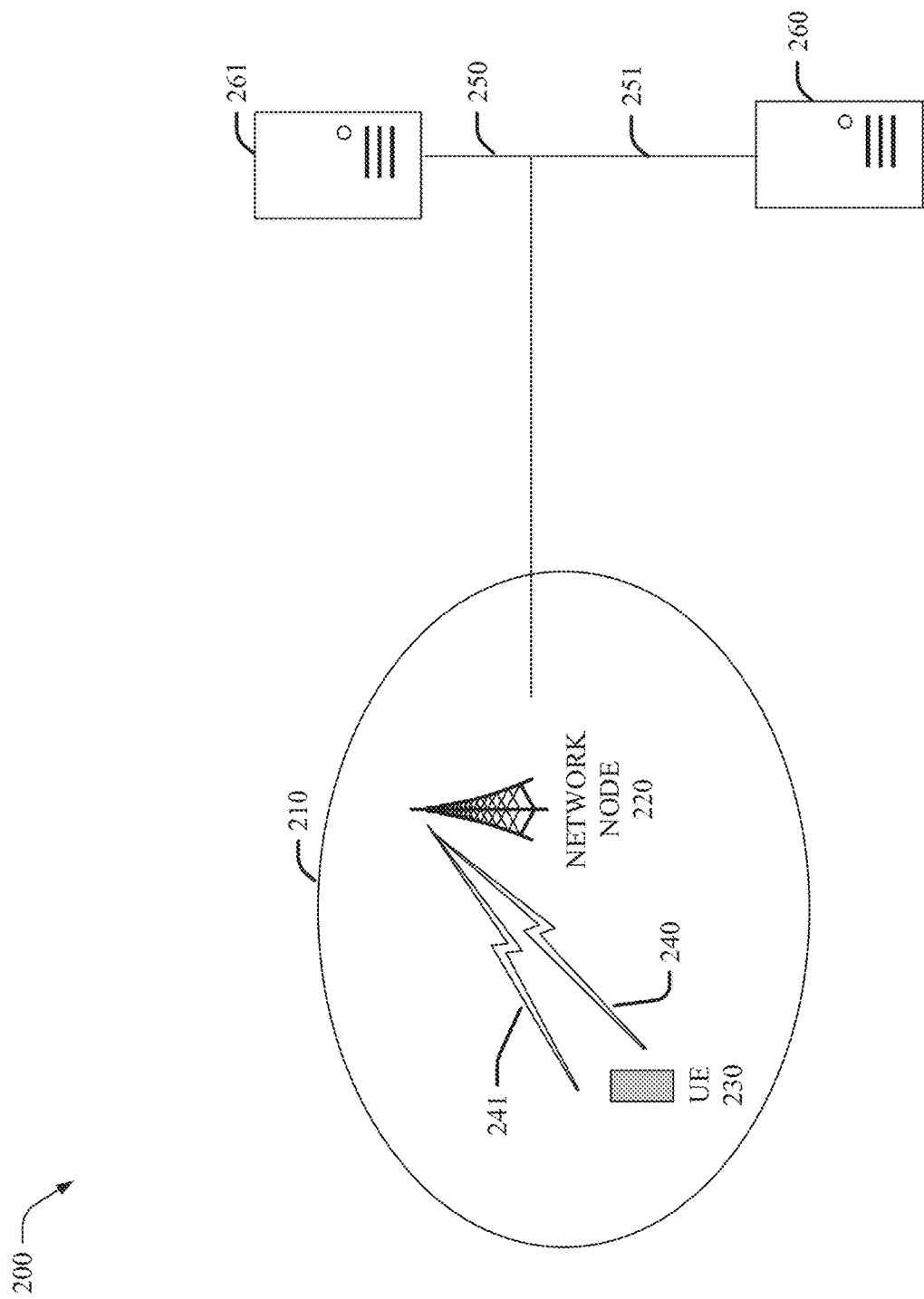
FIG. 2 illustrates an example a wireless communication network according to an embodiment.

Referring now to FIG. 2, illustrated is an example a wireless communication network 200 according to an embodiment. For example, the network 200, comprises base station 220 (e.g., eNB, gNB, network node, etc.), a user equipment (UE) 230 (e.g., communication device), and core networks 260 and 261. User equipment 230 in the coverage area 210 of a base station 220 connects via an air interface 240 to a base station 220. A base station connects to the core network 260 via an interface 250. For brevity, only on UE and base station is shown. It should be known that the wireless communication network may comprise plurality of UEs, base stations, core networks and additional intermediate equipment (not shown).

In the general case a UE with multiple SIM can maintain connections with a plurality of base stations via a plurality of air interfaces whereby each base station belongs to a different operator with a different core network. For ease of exposition, we focus on the case where a UE is equipped with two SIMs (dual sim UE) and connects to the same radio access network (RAN) belonging to a single operator. Now referring to FIG. 2, dual SIM UE 230 connects to base station 220 of a radio network via air interfaces 240 and 241 for a first and second SIM, respectively. Said base station connects to one or more core networks 260, 261 via respective interfaces 250, 251.

Because air interfaces 240, 241 share a single radio they cannot transmit and receive at the same time. In other words, at any given time either the first SIM can use air interface 240 or the second SIM can use air interface 241 to connect to the radio access network and subsequently the core network. Note that a single base station and RAN is merely assumed for ease of exposition here and cannot be construed in a limiting sense. Specifically, air interface 240 and 241 may belong to two separate RANs potentially belonging to different mobile network operators (MNOs).

Furthermore, air interfaces 240, 241 may either be on identical frequencies or separate frequencies. For example, air interface 240 may use a first carrier, and air interface 241 a second carrier. Alternatively, both air interface 240 and 241 use the same carrier. For the case of a single operator and RAN, regardless of the number of carriers, a first SIM may connect to a first core network 260 and a second SIM may connect to a second core network 261. For example, the first core network may be for commercial customers whereas the second core network is for public safety users. How the radio resources for air interfaces 240, 241 are coordinated when a single radio is used for a plurality of SIMs is left to implementation. For example, coordination is possible at the application layer. Specifically, the mobile operating system of the UE may coordinate the radio resources for a plurality of SIMs. Coordination here means that at any given time, either the first SIM transmits and/or receives or, otherwise, the second SIM transmits and/or receives. Such brute-force partitioning of radio resources to either one SIM is disadvantageous for both the user experience and the network efficiency. For example, during a prolonged voice call on one SIM a user cannot be notified of another incoming voice call on another SIM. Similarly, during a prolonged voice call on one SIM a user cannot be notified of incoming text messages or other data notifications sent to another SIM.

In some embodiments, it is assumed that a plurality of SIMs in a single radio device connect to their respective core networks using the same RAN. The two SIMs, however, need not be connected using the same carrier frequencies. For example, user equipment 230 may connect to the radio access network via a first carrier frequency for air interface 240 and via a second carrier frequency for air interface 241. In the example network 200, both cells (one cell per carrier frequency) are provided by the same base station 220. Alternatively, user equipment 230 may connect to a first base station 220 via a first carrier frequency for air interface 240 and to a second base station via a second carrier frequency for air interface 241. The plurality of SIMs of a single radio device may connect to the same or different core network. For example, a first SIM may be connected to a first core network 260 via air interface 240 and RAN-to-CN backhaul 250, whereas a second SIM may be connected to a second core network 261 via air interface 241 and RAN-to-CN backhaul 251.

In an aspect of an embodiment, a first SIM is in RRC connected mode using air interface 240 to communicate with the RAN and subsequently with a first core network whereas a second SIM is in RRC idle mode. According to prior art, the UE shall monitor for paging messages from the network for the second SIM. Because of the single radio available for transmission and reception, and because the first SIM is in RRC connected mode, i.e., actively transmitting and receiving, the UE cannot monitor for incoming paging messages for the second SIM as required by prior art. In one example, the paging message for the second idle mode SIM is delivered to the UE via the first connected mode SIM.

In an aspect of an embodiment, while a first SIM is in connected mode and a second SIM is in idle, and further assuming that both air interfaces 240 and 241 for the first and second SIM share the same carrier frequency and base station 220 (i.e., the same cell), the UE monitors for paging messages for the second idle mode SIM while simultaneously receiving unicast and broadcast transmissions for the first connected mode SIM. In this example, the network can always make sure that both air interfaces 240 and 241 share the same carrier frequency by using existing handover procedures for the connected mode SIM. For example, for the purpose of paging, the network knows the carrier frequency of the idle mode SIM. It can then perform a handover procedure for the connected mode SIM whereby the handover switches the carrier frequency of the connected mode SIM to be identical with that of the idle mode SIM.

In aspects of some embodiments, the network (one or more core network 260, 261) need to be aware of the plurality of SIMs belonging to the same radio. In an embodiment, when the UE registers with the network, it signals all the international mobile subscriber identities (IMSI) associated with it to the network. Furthermore, in case of a plurality of core networks 260, 261, an interface is assumed that allows said core networks to communicate with each other (interface not shown). Specifically, each SIM or IMSI is associated with a given core network and other core networks are aware of these associations including how to communicate with the respective core networks associated with a given SIM/IMSI including, but not limited to the IP address, protocol, and so forth. At any given time, each core network is also aware which SIM is currently active. This can be achieved by the communication links between the respective core networks.

In an embodiment, if core network 261 wants to send a paging message to UE 230 with a first SIM in RRC idle mode using air interface 241, it sends said paging message to core network 260 instead which can send the paging message to UE 230 using a second SIM in RRC connected mode using air interface 240. Note that the first idle mode SIM in this example is associated with core network 261 and core network 261 is aware that the second SIM is in active mode and connected to core network 260. Thus it can send the paging message to core network 260. In this example, the paging message is transmitted to UE 230 using air interface 240 of base station 220 connected to core network 260. The paging message can be sent using the TCP/IP protocol using a physical downlink shared channel (PDSCH) transmitted on air interface 240.

Upon reception of a paging message, the UE initiates a random access procedure to establish RRC connection. RRC setup procedures include security setup procedures with security keys and alike. Hence, because in this solution the RRC connection including any security procedures is with core network 260 whereas the paging core network is 261, the UE simply receives the paging message and the action upon reception of the paging message is left to the application layer. For example, the subscriber may decide upon reception of the paging message to terminate the connection to core network 260 using the active SIM and air interface 240 and to initiate RRC connection setup with core network 261 using air interface 241. In other words, unlike in prior art, the paging message itself does not trigger the random access procedure. Rather, the paging message triggers some kind of alert or notification to the subscriber who then triggers the random access procedure.

The network does not know on which cell a particular idle mode UE is camping and monitoring for paging messages from the network. Rather, the network sends paging messages for an idle mode SIM in all cells of a specified tracking area. Defining tracking areas that are larger than individual cells has the benefit that whenever an idle mode SIM crosses a cell boundary it does not need to inform the network about it as long as the new cell is part of the same tracking area. In other words, the UE only signals to the network when it changes the tracking area, a procedure called tracking area updated or TAU. Hence, the concept of tracking areas can greatly reduce signalling overhead in the network for idle mode UEs.

As mentioned before, however, for the aspects related to the embodiments herein, it is assumed that the network is aware of the plurality of SIMs belonging to the same radio and that each core network is also aware which SIM is currently active. In other words, for the aspects related to the embodiments herein, at least one SIM is active and the core networks of idle mode SIMs are aware of the core network corresponding to said active SIMs.

In another embodiment, the UE ensures that the idle mode SIMs always camp and monitor for paging messages on the same cell to which the active mode SIM is connected. As mentioned before, the network can always make sure that both air interfaces 240 and 241 share the same carrier frequency, or more precisely the same cell, by using existing handover procedures for the connected mode SIM. In other words, we assume the idle mode SIM and the active mode SIM use air interface 240 and 241, respectively, on the same carrier frequency and that the active mode SIM is connected to a cell via air interface 240 that is also the cell on which the idle mode UE camps. Consequently, the concept of tracking areas is no longer needed as long as one of the SIMs is in active mode because the core networks of idle mode SIMs are aware of the core networks corresponding to the active SIMs which in turn know the exact cell to which a UE is connected. Hence, any paging message can be sent in that one cell rather than sending it in all cells of a tracking area. More precisely, any active mode SIM has one cell, the so-called primary cell or PCell on which it receives all control signaling and messages from the network. Said PCell then also defines the cell on which paging messages to idle mode SIMs are sent.

From a signaling perspective there thus exists the following tradeoff: According to prior art, paging messages must be sent in all cells of a tracking area. For large tracking areas, this means the same messages is first sent via a plurality of interfaces 250 from the core network 260 to a plurality of base stations 220 which then send identical messages via a plurality of air interfaces 240 in a plurality of cells 210 whereby all cells 210 belong to the tracking area of interest. According to the aspects related to the embodiments herein, the core network 260 sends the paging message to one base station 220 via an interface 250 and said base station sends the paging message on air interface 240 in one cell 210 whereby said cell is known to the core network from the cell to which active mode SIMs are connected. In other words, aspects related to the embodiments herein require new signaling procedures between core networks whenever an active mode SIM performs a handover and changes the cell to which it is connected.

Another benefit of the proposed aspect of some embodiments is that because the PCells on which idle mode SIMs camp and the PCells to which idle mode SIMs are connected are all identical, they use identical search space set and control resource set (CORESET) configurations for common search space (CSS) type 2 which according to the 5G NR specifications the UE uses to monitor for physical downlink control channel (PDCCH) transmissions with cyclic redundancy check (CRC) bits scrambled with the P-RNTI, i.e., the radio network temporary identifier (RNTI) associated with paging. According to prior art, a UE can receive PDCCH with CRC scrambled by P-RNTI while being in connected mode (some restrictions apply) to offer services like ETWS (Earthquake and Tsunami Warning System) and CMAS (Commercial Mobile Alert System). However, a UE is not expected to receive paging messages on a Physical Downlink Shared Channel (PDSCH) scheduled by a PDCCH with CRC scrambled by the P-RNTI while in connected mode. However, according to prior art, a UE in RRC connected mode is indeed required to decode other common broadcast channels transmitted on the air interface via a PDSCH, e.g., for system information (SI) acquisition: "On a frequency range 1 cell, the UE shall be able to decode a PDSCH scheduled with C-RNTI, MCS-C-RNTI, or CS-RNTI and, during a process of P-RNTI triggered SI acquisition, another PDSCH scheduled with SI-RNTI that partially or fully overlap in time in non-overlapping PRBs, unless the PDSCH scheduled with C-RNTI, MCS-C-RNTI, or CS-RNTI requires Capability 2 processing time according to subclause 5.3 in which case the UE may skip decoding of the scheduled PDSCH with C-RNTI, MCS-C-RNTI, or CS-RNTI." (3GPP TS 38.214, Version 25.6.0, 2019-06). In some embodiment, the connected mode UE monitors for paging messages to idle mode SIMs. In other words, while being in connected mode for a first SIM, it monitors for PDCCH with CRC scrambled by P-RNTI according to prior art. Unlike prior art, however, upon reception of a PDCCH with CRC scrambled by P-RNTI, the UE proceeds to decode the PDSCH scheduled by said PDCCH with CRC scrambled by P-RNTI. The UE then checks if any of its idle mode SIMs was paged by the paging message carried on said PDSCH. If such is the case, the display of the user equipment may provide the subscriber with either an option to ignore the incoming paging message or, alternatively, to switch the single radio to being connected using the SIM that was paged by the PDSCH. In this case, the first SIM terminates the existing RRC connection and the UE initiates a random-access procedure to establish RRC connected mode using the SIM that was paged.

Traditionally, upon reception of a paging message, the UE initiates a random-access procedure to establish RRC connection. Because the UE only has a single radio and cannot initiate a random-access procedure while simultaneously maintaining its existing RRC connection, in this solution the action upon reception of the paging message is left to the application layer and/or subscriber. For example, the subscriber may decide upon reception of the paging message to terminate the existing connection using the active SIM and air interface 240 and to initiate RRC connection setup using air interface 241 and the SIM that was paged by the PDSCH. In other words, unlike in prior art, the paging message itself does not trigger the random-access procedure. Rather, the paging message triggers some kind of alert or notification to the subscriber who then triggers the random-access procedure.

According some aspects of the embodiments, while the subscriber is informed about a paging message to an idle mode SIM by means of audio/visual alerts or notifications, the subscriber is not provided any information beyond the mere presence of a paging message (e.g., "missed call" or "text message received" or any other indication that request for a connection was made for your SIM, the SIM in idle). Specifically, the cause for paging (e.g., incoming phone call, data session, text message . . . ) remains unknown to the subscriber as does information pertaining to who is calling, who is texting, or which application, service, website . . . is sending data to the subscriber. The reasons for that are manifold. For example, according to some aspects of the embodiments herein, while the proposed solutions allow an idle mode SIM to receive paging messages, they do not allow the single radio UE to respond to an incoming paging message for an idle mode SIM when simultaneously being in RRC connected mode using another SIM. Hence, RRC connection setup procedures including security setup procedures cannot be accomplished for the idle mode SIM as response to the incoming paging message. These, however, are required to inform the subscriber about sensitive information such as who is calling or texting. In other words, the paging message itself, which is a broadcast message to a plurality of subscribers and not protected the same way as a unicast message sent to a dedicated UE in RRC connected mode, cannot carry such information directly. Whereas traditionally the paging message would result in RRC connection setup, this thus is not possible here.

Without revealing sensitive information like who is calling or what service/application/website/ . . . is initiating data transfer, there may still be a benefit in at least informing the subscriber about the type of connection request that resulted in the paging message. For example, a subscriber may be making a phone call on a first active SIM. During said phone call, a paging message is received for a SIM in RRC idle mode. Most likely, the subscriber would not want to terminate the phone call for a text message or email sent to the idle mode SIM. At the same time, if the paging message is for an incoming phone call to the idle mode SIM, the subscriber may want to choose to hang up the active call and take the incoming call. Hence, the paging message contains a field to signal the type of connection initiating the paging. The many different types of connections can be indicated depends on the number of bits in said bit field. For example, a single bit could indicate whether the paging message is for a phone call or not. Receiving the paging message could result in the user interface of the user equipment displaying a graphical user interface (GUI) that presents the subscriber with options to either ignore the incoming call, or to terminate the on-going call to take the incoming call, in case the bit in the paging message indicates a phone call. Similarly, more than one bit could indicate more different types of reasons why the paging message was sent, and a similar GUI could be used to present the subscriber with options to read the text message or email, or to establish a data connection if those are the reasons why the idle mode SIM was paged. However, in either way, this would require the subscriber to terminate the on-going call. In one example, two bits in the paging message can indicate one of four reasons for the paging such as {phone call, email, SMS, other}. Depending on which reason is signaled in the paging message, the GUI presents options to either ignore the paging message or, depending on the reason, to terminate the phone call and {take the other call, read the email, read the SMS, hang up}. These procedures are especially useful if an idle mode SIM is paged during a phone call using the active SIM. For example, using the mobile operating system of the UE or any other means, the subscriber may configure a primary line and a set of secondary lines. Moreover, at most one SIM can be associated for data transfer whereas all other SIMs can only be used for phone calls and SMS. By default, the active SIM is the one designated for data connections. Hence, the subscriber can always receive data incl. notifications sent to specific apps running on the mobile operating system of the UE. A paging message to an idle mode SIM contains one or more bits to signal whether the cause for the paging is a phone call or an SMS. In case of a phone call, the subscriber is presented with an option to take the phone call. This terminates the active connection with the data SIM. In case of an incoming text message, no action is presented to the subscriber. Rather, the UE tries to receive the SMS autonomously during an OFF period of the DRX cycle of the active SIM.

Figure 3:
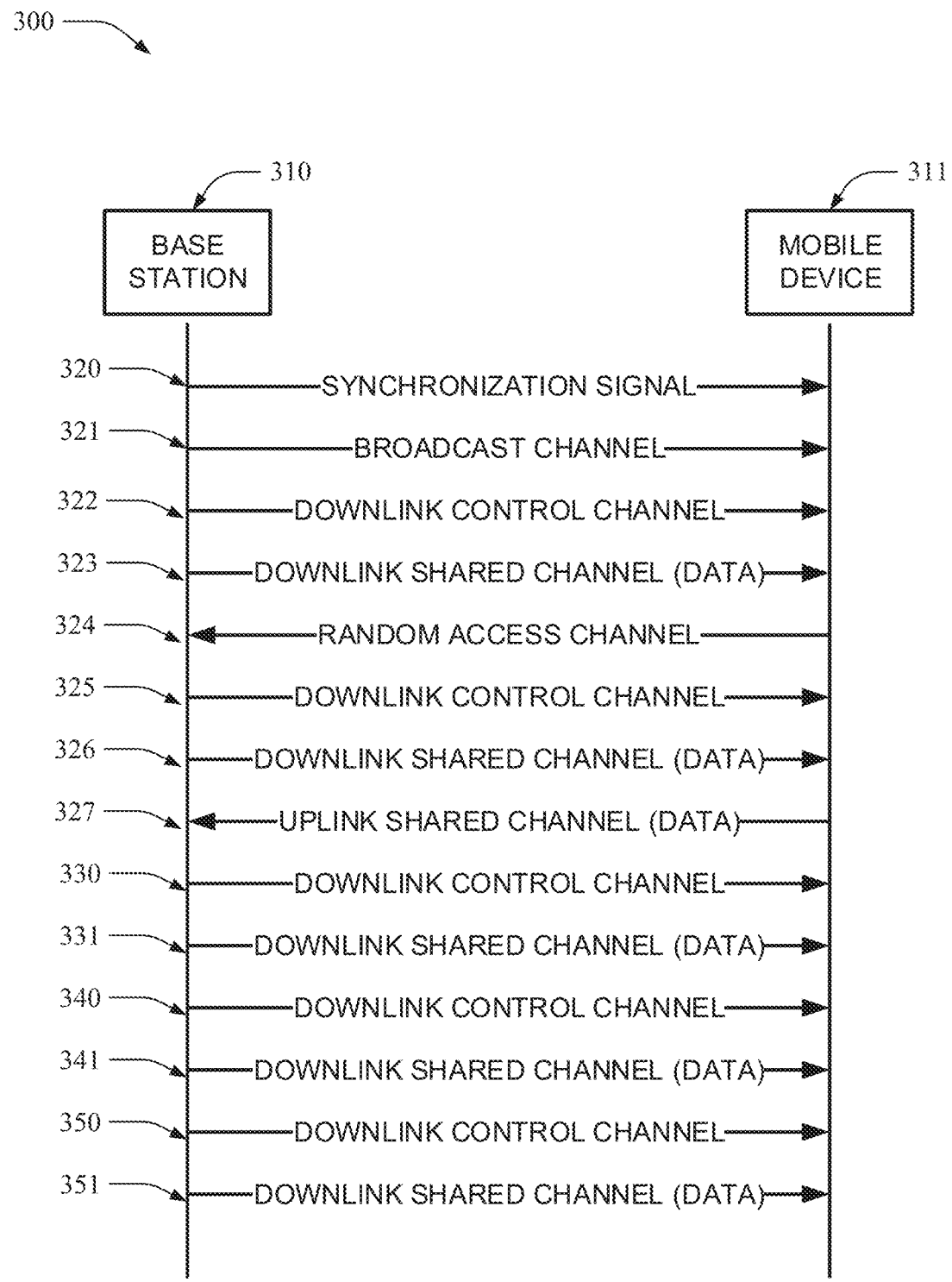
FIG. 3 illustrates an example of interaction between devices of a wireless communication system according to an embodiment.

Referring now to FIG. 3, illustrated is an example of interaction between devices of a wireless communication system according to an embodiment. A mobile device 311 (e.g., UE or mobile station device) performs a cell search procedure in an exemplary system 300 by decoding a synchronization signal 320 from a base station device 310 (e.g., eNB or gNB). For instance, the base station device 310 may be the base station 220 of FIG. 2 and the mobile station device 311 may be the user equipment 230 of FIG. 2. The synchronization signal 320 is then transmitted via the air interfaces 240, 241 between a base station device and a mobile station device (UE). After successfully decoding the synchronization signal 320, the mobile station device 311 proceeds to acquiring the master system information carried on the physical broadcast channel (PBCH) 321. The master system information configures the UE for reception of remaining system information (RMSI) transmitted by a physical downlink shared channel (PDSCH) 323 which is scheduled by a physical downlink control channel transmission (PDCCH) 321. The RMSI then configures the UE for a random-access procedure whereby mobile station device 311 sends a physical random access channel (PRACH) 324 to base station device 310 (message 2). Base station device 310 responds via a random-access response (RAR) carried by a physical downlink shared channel (PDSCH) 326 scheduled by a physical downlink control channel transmission (PDCCH) 325 (message 2). Finally, the mobile station device 311 sends message 3 on a physical uplink shared channel (PUSCH) 327 scheduled by message 2 in 326. If necessary, contention resolution is performed by the network by transmitting message 4 from base station device 310 to the intended mobile station device 311 informing other contending UEs of the contention. Message 4 is scheduled by PDCCH 330 and transmitted by PDSCH 331. After successful contention resolution, mobile station device 311 is provided a dedicated radio resource control (RRC) configuration in PDSCH transmission 341 which is scheduled by PDCCH 340. At this point, base station device 310 and mobile station device 311 have successfully established a dedicated communication link 240. Subsequently, mobile station device 311 may be configured according to the embodiments herein. Said configuration is transmitted by PDSCH 351 scheduled by PDCCH 350.

Figure 4:
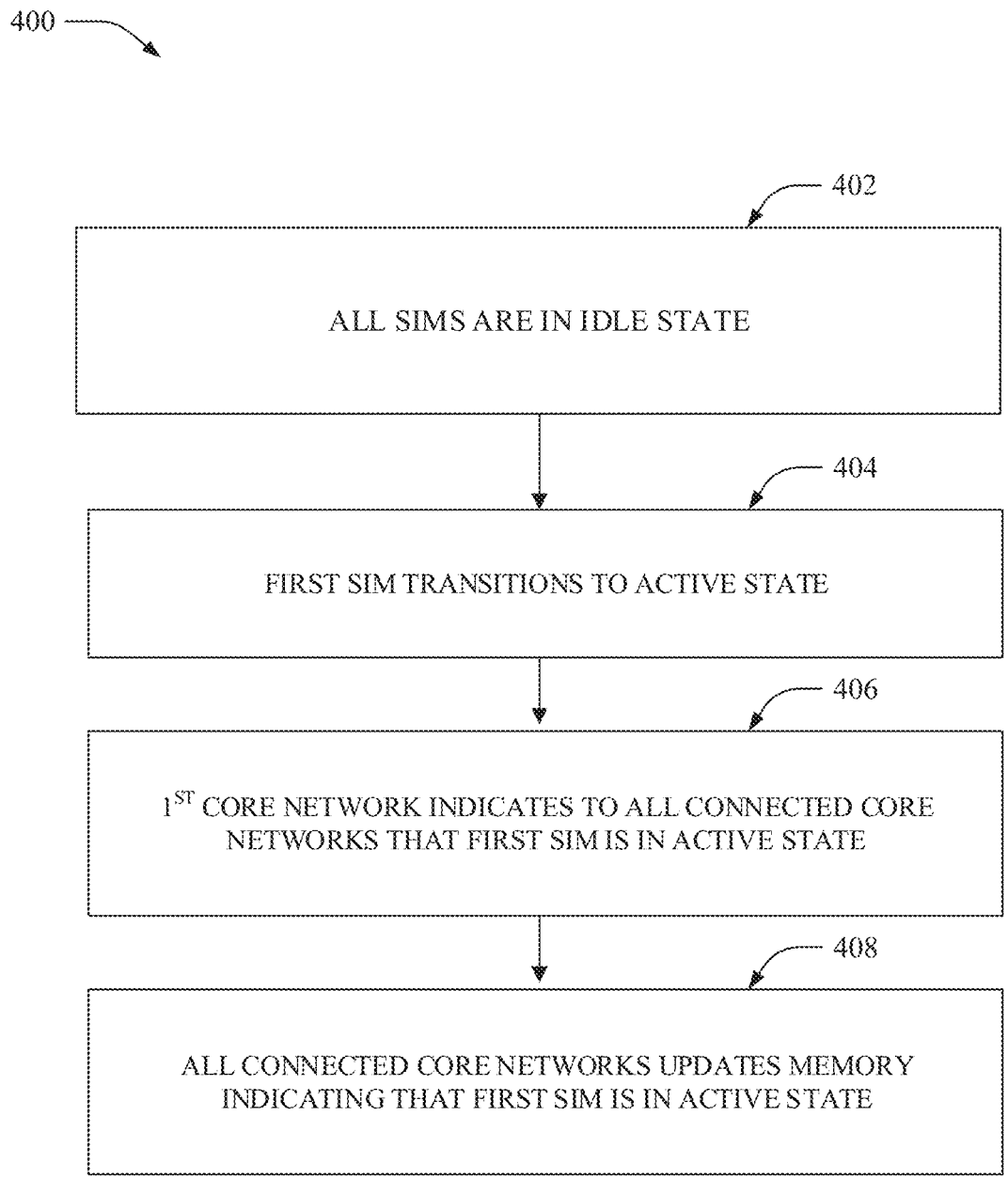
FIG. 4 depicts a diagram of an example, non-limiting computer implemented method that facilitates paging an idle subscriber identity module using a connected subscriber identity module operating in a single radio configuration in accordance with one or more embodiments described herein.

FIG. 4 depicts a diagram of an example, non-limiting computer implemented method that facilitates paging an idle subscriber identity module using a connected subscriber identity module operating in a single radio configuration in accordance with one or more embodiments described herein. In some examples, flow diagram 400 can be implemented by operating environment 1400 described below. It can be appreciated that the operations of flow diagram 500 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 4.

Operation 402 depicts all SIMs of a UE are in idle state (e.g., the UE is in idle or standby mode). Operation 404 depicts one of the SIM, e.g., first SIM, transitions to active state. This may occur due to the UE initiating a communication link or responding to a request to establish a communication to receive information from the core network. For example, an audio or visual call. Operation 406 depicts the core network, $1^{st}$ core network that is associated with the first SIM, indicates to all connected core networks (e.g., one or more core networks having a communication link with the $1^{st}$ core network) that the first SIM is in active state. Operation 408 depicts all connected core networks updating the respective memory that the first SIM is in active state. Advantage is that core network can first check its own memory to determine if a SIM is in active or in idle state before conducting a search with other core networks.

Figure 5:
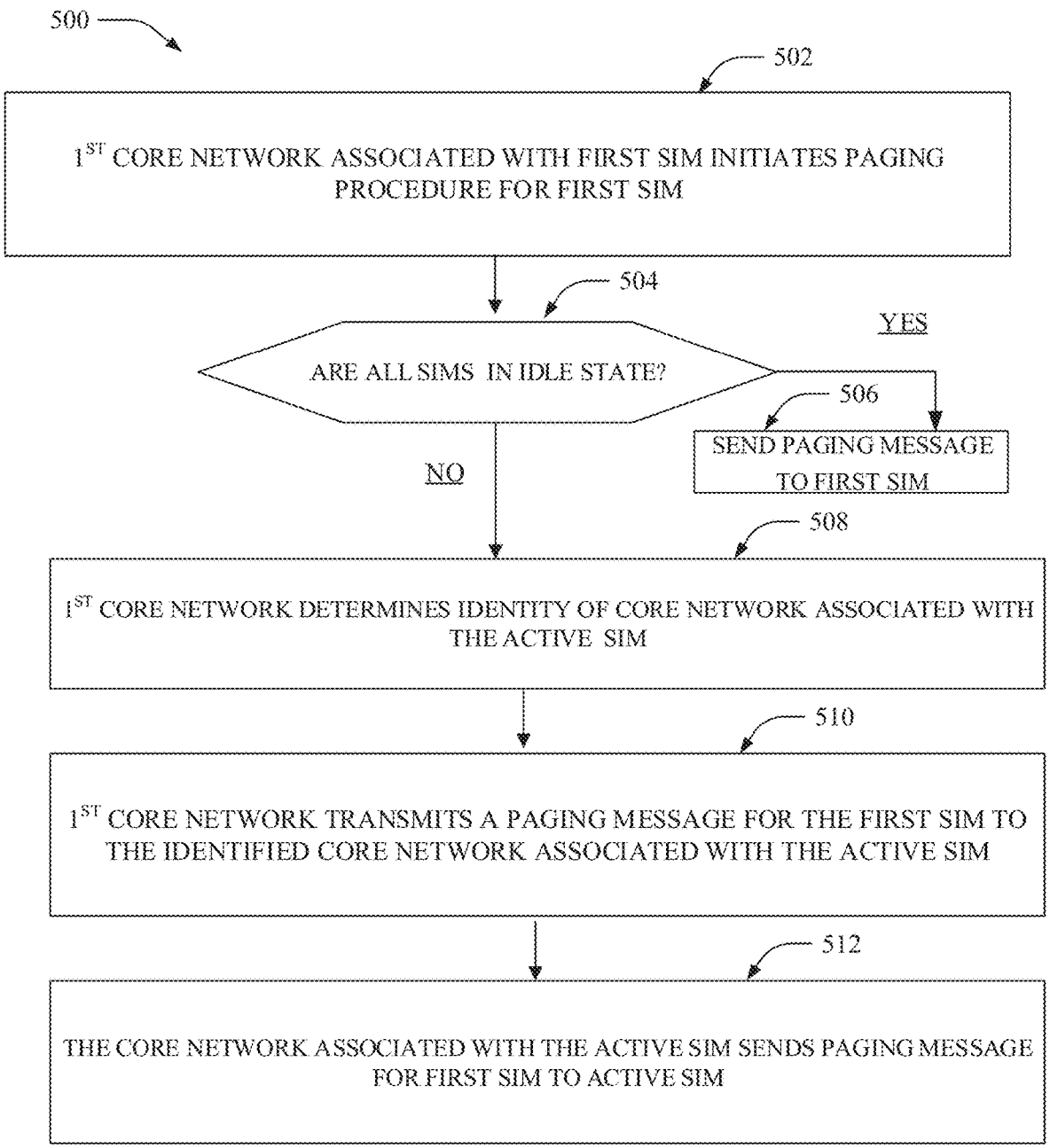
FIG. 5 depicts a diagram of an example, non-limiting computer implemented method that facilitates paging an idle subscriber identity module using a connected subscriber identity module operating in a single radio configuration in accordance with one or more embodiments described herein.

FIG. 5 depicts a diagram of an example, non-limiting computer implemented method that facilitates paging an idle subscriber identity module using a connected subscriber identity module operating in a single radio configuration in accordance with one or more embodiments described herein. In some examples, flow diagram 500 can be implemented by operating environment 1400 described below. It can be appreciated that the operations of flow diagram 500 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 5.

Operation 502 depicts a first core network associated with a first SIM initiates paging procedure for the first SIM whereby said first SIM is in idle mode. Operation 504 depicts determining if all other SIMs in operation in a single radio configuration are idle. If determined that all the SIMs in operation in a single radio configuration are idle, then at operation 506, send paging message to the first SIM. Otherwise perform operations 508-512. Operation 508 depicts the first core network determines identity of a core network associated with the active SIM. Operation 510 depicts that the first core network transmits a paging message for the first SIM to the identified core network associated with the active SIM. Operation 512 depicted the core network associated with the active SIM sends the paging message for the first SIM to active SIM.

Figure 6:
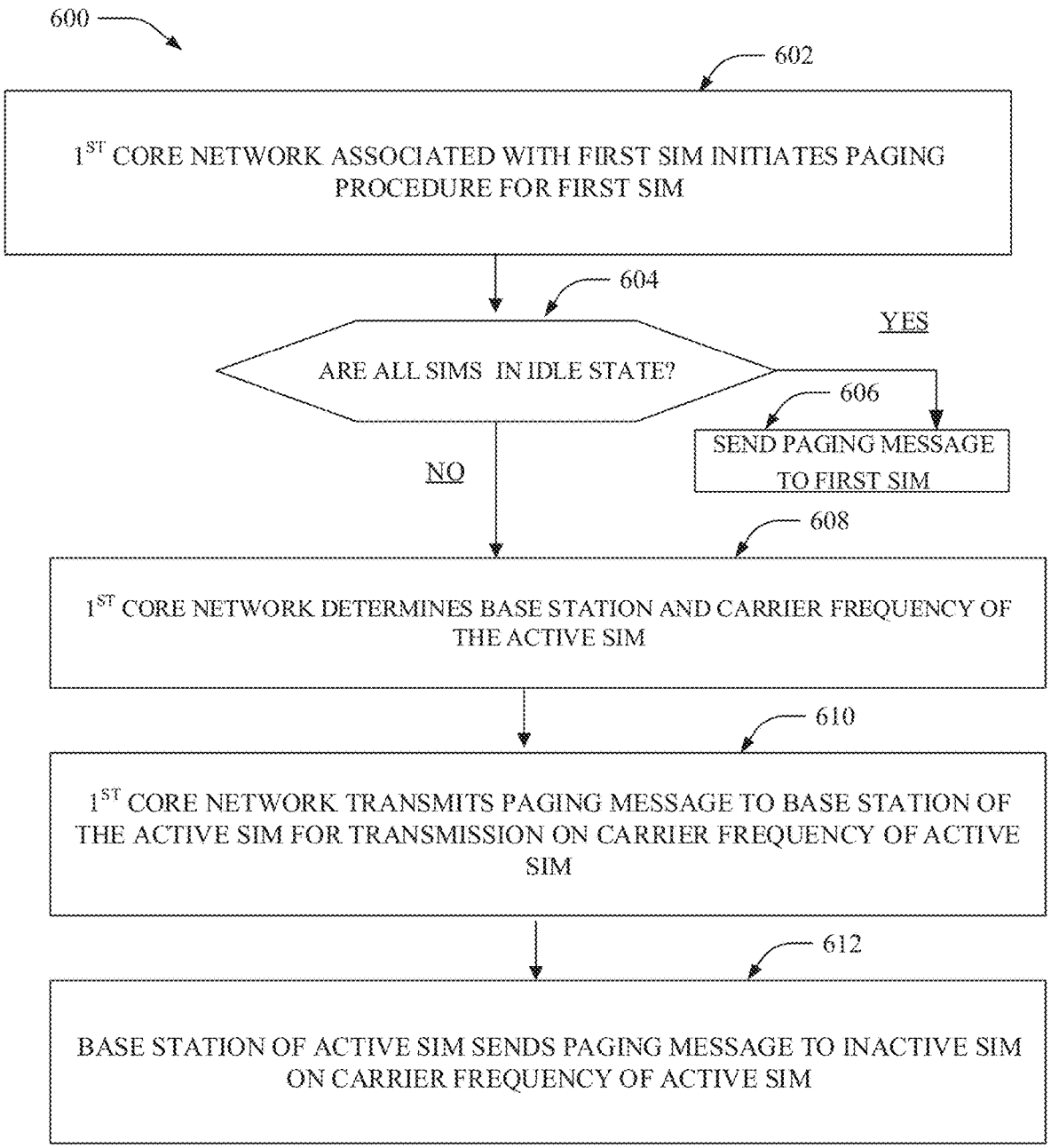
FIG. 6 depicts a diagram of an example, non-limiting computer implemented method that facilitates paging an idle subscriber identity module using a connected subscriber identity module operating in a single radio configuration in accordance with one or more embodiments described herein.

FIG. 6 depicts a diagram of an example, non-limiting computer implemented method that facilitates paging an idle subscriber identity module using a connected subscriber identity module operating in a single radio configuration in accordance with one or more embodiments described herein. In some examples, flow diagram 600 can be implemented by operating environment 1400 described below. It can be appreciated that the operations of flow diagram 600 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts a first core network associated with a first SIM initiates paging procedure for the first SIM. Operation 604 depicts determining if all the SIMs in operation in a single radio configuration are idle. If determined that all the SIMs in a single radio configuration are idle, then at operation 606, send paging message to the first SIM. Otherwise perform operations 608-612. Operation 608 depicts the first core network determines base station and carrier frequency of the active SIM. Operation 610 depicts that the first core network transmits paging message to base station of the active SIM for transmission on carrier frequency of active SIM. Operation 612 depicted base station of active SIM sends paging message to inactive SIM on carrier frequency of active SIM.

Figure 7:
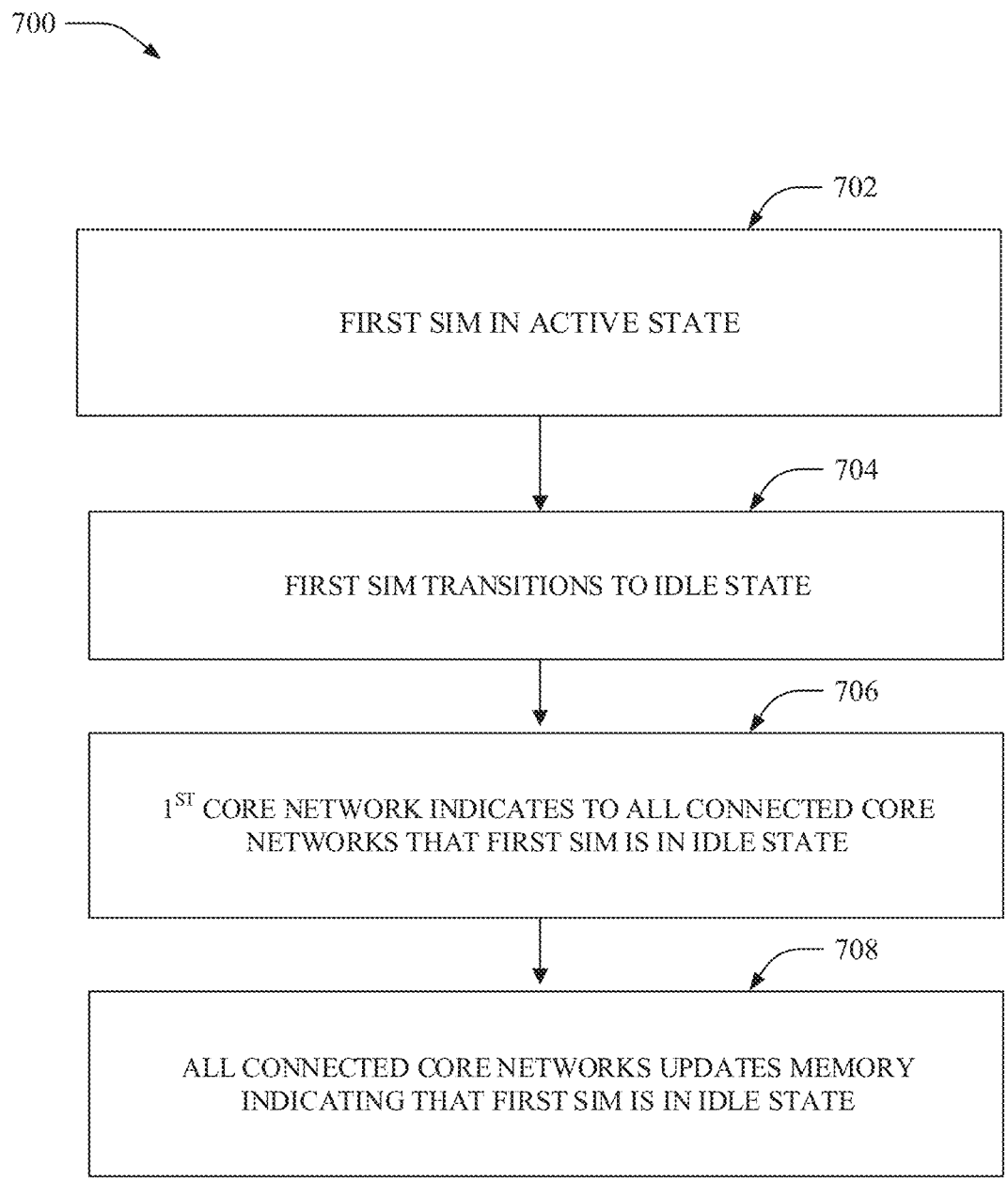
FIG. 7 depicts a diagram of an example, non-limiting computer implemented method that facilitates paging an idle subscriber identity module using a connected subscriber identity module operating in a single radio configuration in accordance with one or more embodiments described herein.

FIG. 7 depicts a diagram of an example, non-limiting computer implemented method that facilitates paging an idle subscriber identity module using a connected subscriber identity module operating in a single radio configuration in accordance with one or more embodiments described herein. In some examples, flow diagram 700 can be implemented by operating environment 1400 described below. It can be appreciated that the operations of flow diagram 500 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts first SIM in active state. Operation 704 depicts first SIM transitioning to idle state. Operation 706 depicts the $1^{st}$ core network indicates to all connected core networks that first SIM is in idle state. Operation 708 depicts all connected core networks updating the respective memory that the first SIM is in active state. Advantage is that core network can first check its own memory to determine if a SIM is in active or in idle state before conducting a search with other core networks.

Figure 8:
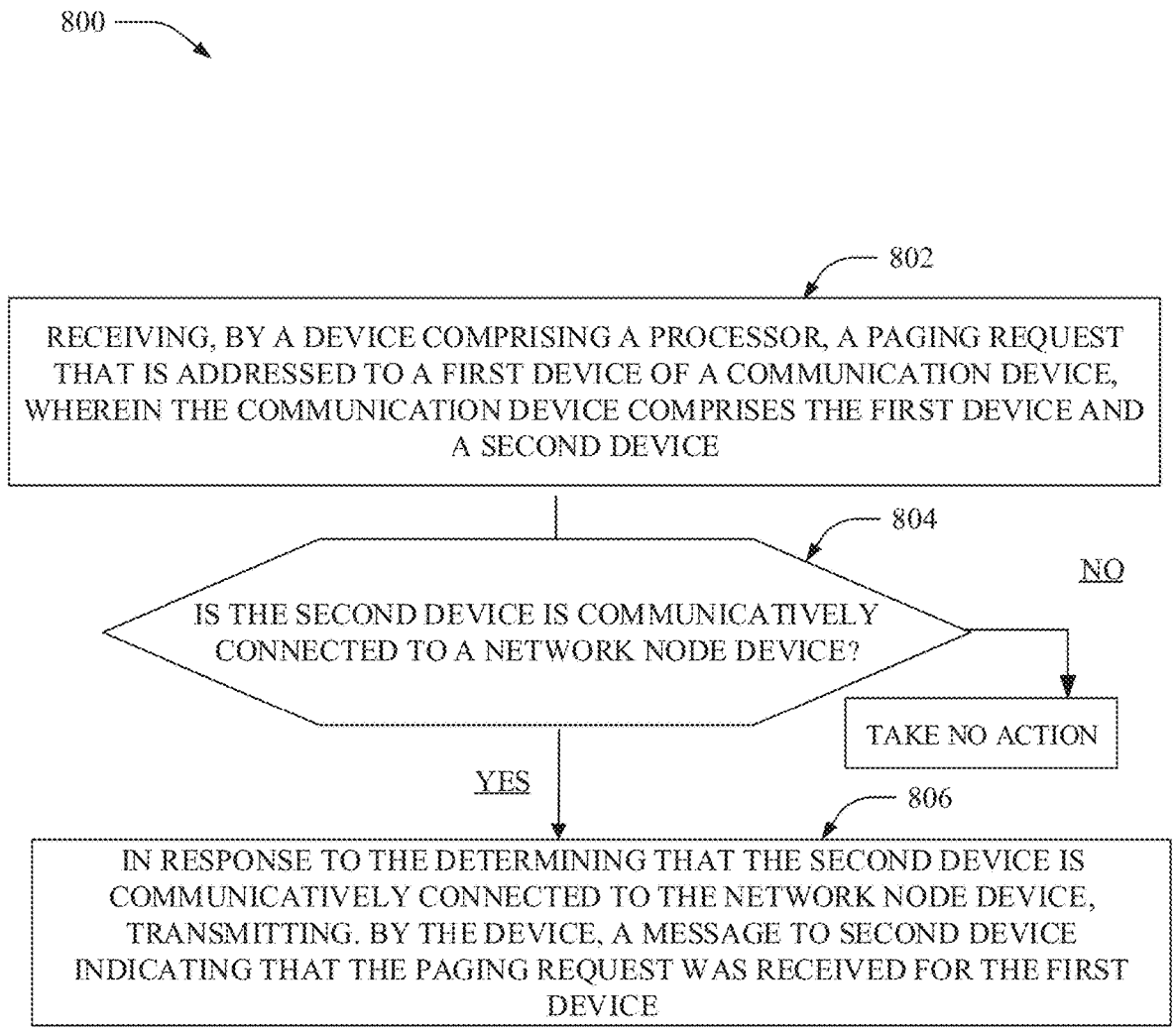
FIG. 8 depicts a diagram of an example, non-limiting computer implemented method that facilitates paging an idle subscriber identity module using a connected subscriber identity module operating in a single radio configuration in accordance with one or more embodiments described herein.

FIG. 8 depicts a diagram of an example, non-limiting computer implemented method that facilitates paging an idle subscriber identity module using a connected subscriber identity module operating in a single radio configuration in accordance with one or more embodiments described herein. In some examples, flow diagram 800 can be implemented by operating environment 1400 described below. It can be appreciated that the operations of flow diagram 800 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts receiving, by a device comprising a processor, a paging request that is addressed to a first device of a communication device, wherein the communication device comprises the first device and a second device. Operation 804 depicts determining, by the device, whether the second device is communicatively connected to a network node device? If determined that the second device is communicatively connected to a network node device, perform Operation 806. Otherwise take no action (e.g., continue as if the paging message was received for the device that is connected to the network node device or continue monitoring). Operation 808 depicts in response to the determining that the second device is in the active state, transmitting, by the device, a message to second device indicating that the paging request was received for the first device.

Figure 9:
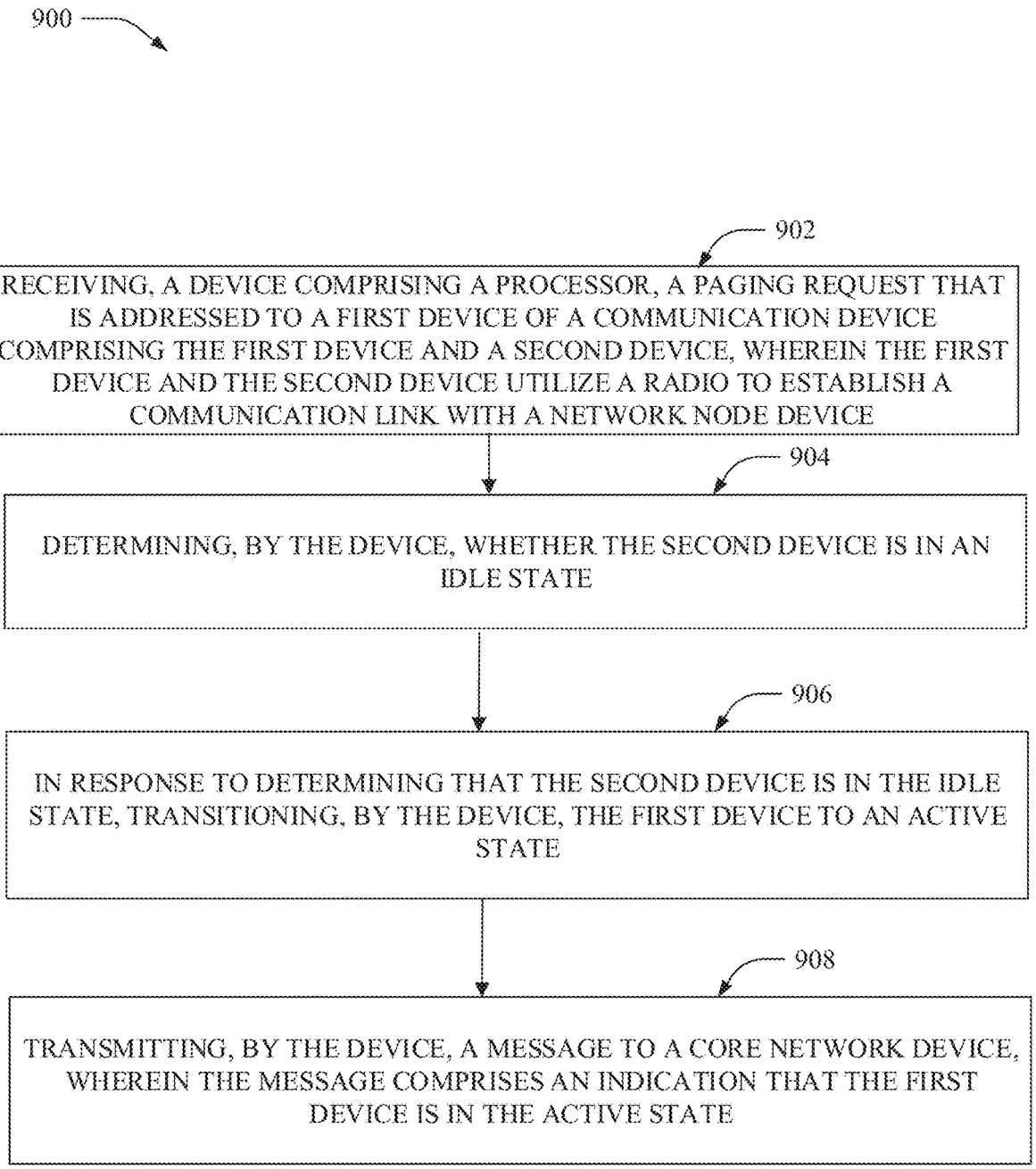
FIG. 9 depicts a diagram of an example, non-limiting computer implemented method that facilitates paging an idle subscriber identity module using a connected subscriber identity module operating in a single radio configuration in accordance with one or more embodiments described herein.

FIG. 9 depicts a diagram of an example, non-limiting computer implemented method that facilitates paging an idle subscriber identity module using a connected subscriber identity module operating in a single radio configuration in accordance with one or more embodiments described herein. In some examples, flow diagram 900 can be implemented by operating environment 1400 described below. It can be appreciated that the operations of flow diagram 900 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts receiving, a device comprising a processor, a paging request that is addressed to a first device of a communication device comprising the first device and a second device, wherein the first device and the second device utilize a radio to establish a communication link with a network node device. Operation 904 depicts determining, by the device, whether the second device is in an idle state. Operation 906 depicts in response to determining that the second device is in the idle state, transitioning, by the device, the first device to an active state. Operation 908 depicts transmitting, by the device, a message to a core network device, wherein the message comprises an indication that the first device is in the active state.

Figure 10:
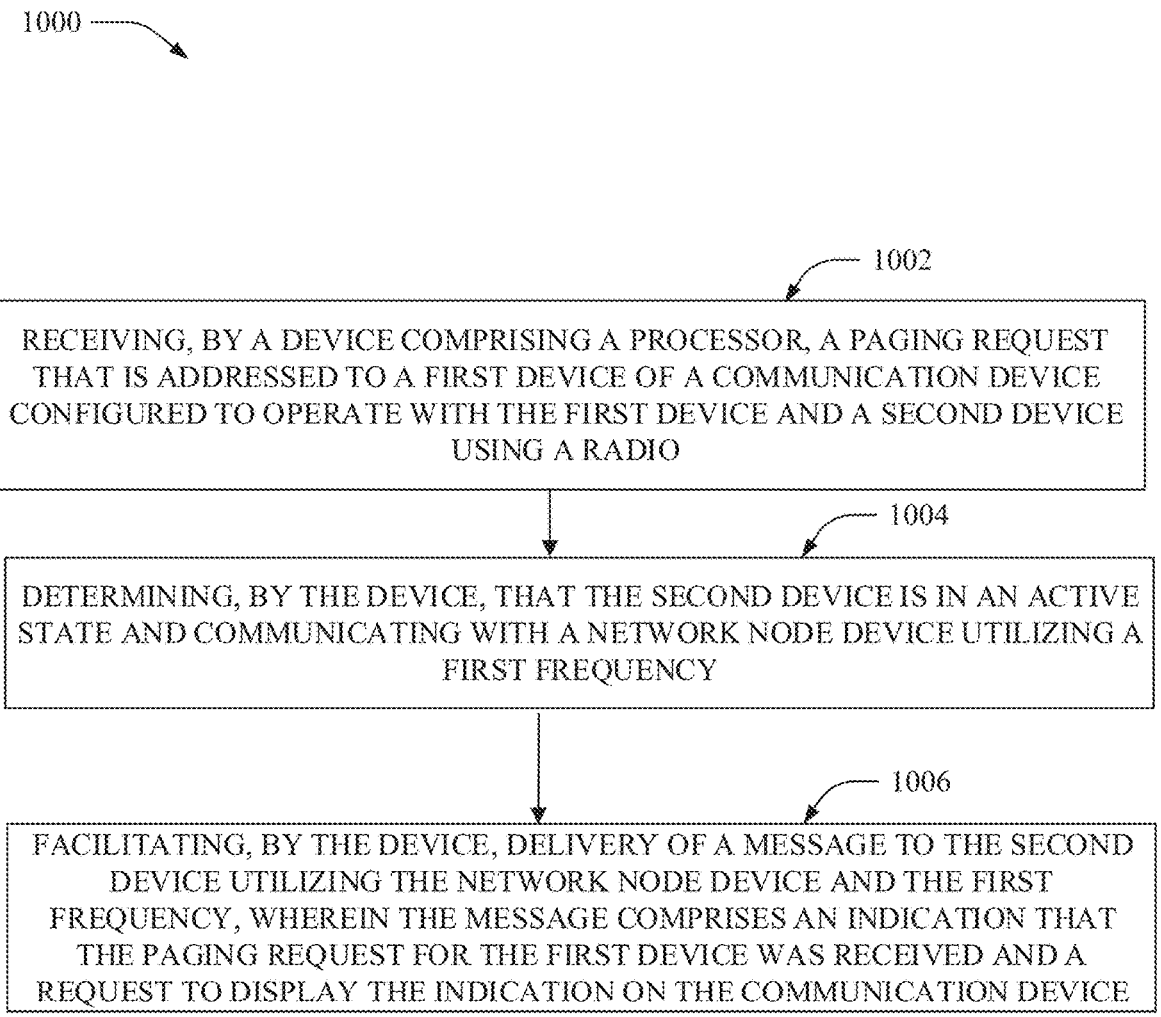
FIG. 10 depicts a diagram of an example, non-limiting computer implemented method that facilitates paging an idle subscriber identity module using a connected subscriber identity module operating in a single radio configuration in accordance with one or more embodiments described herein.

FIG. 10 depicts a diagram of an example, non-limiting computer implemented method that facilitates paging an idle subscriber identity module using a connected subscriber identity module operating in a single radio configuration in accordance with one or more embodiments described herein. In some examples, flow diagram 1000 can be implemented by operating environment 1400 described below. It can be appreciated that the operations of flow diagram 1000 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 10.

Operation 1002 depicts receiving, by a device comprising a processor, a paging request that is addressed to a first device of a communication device configured to operate with the first device and a second device using a radio. Operation 1004 depicts determining, by the device, that the second device is in an active state and communicating with a network node device utilizing a first frequency. Operation 1006 depicts facilitating, by the device, delivery of a message to the second device utilizing the network node device and the first frequency, wherein the message comprises an indication that the paging request was received for the first device was received and a request to display the indication on the communication device.

Figure 11:
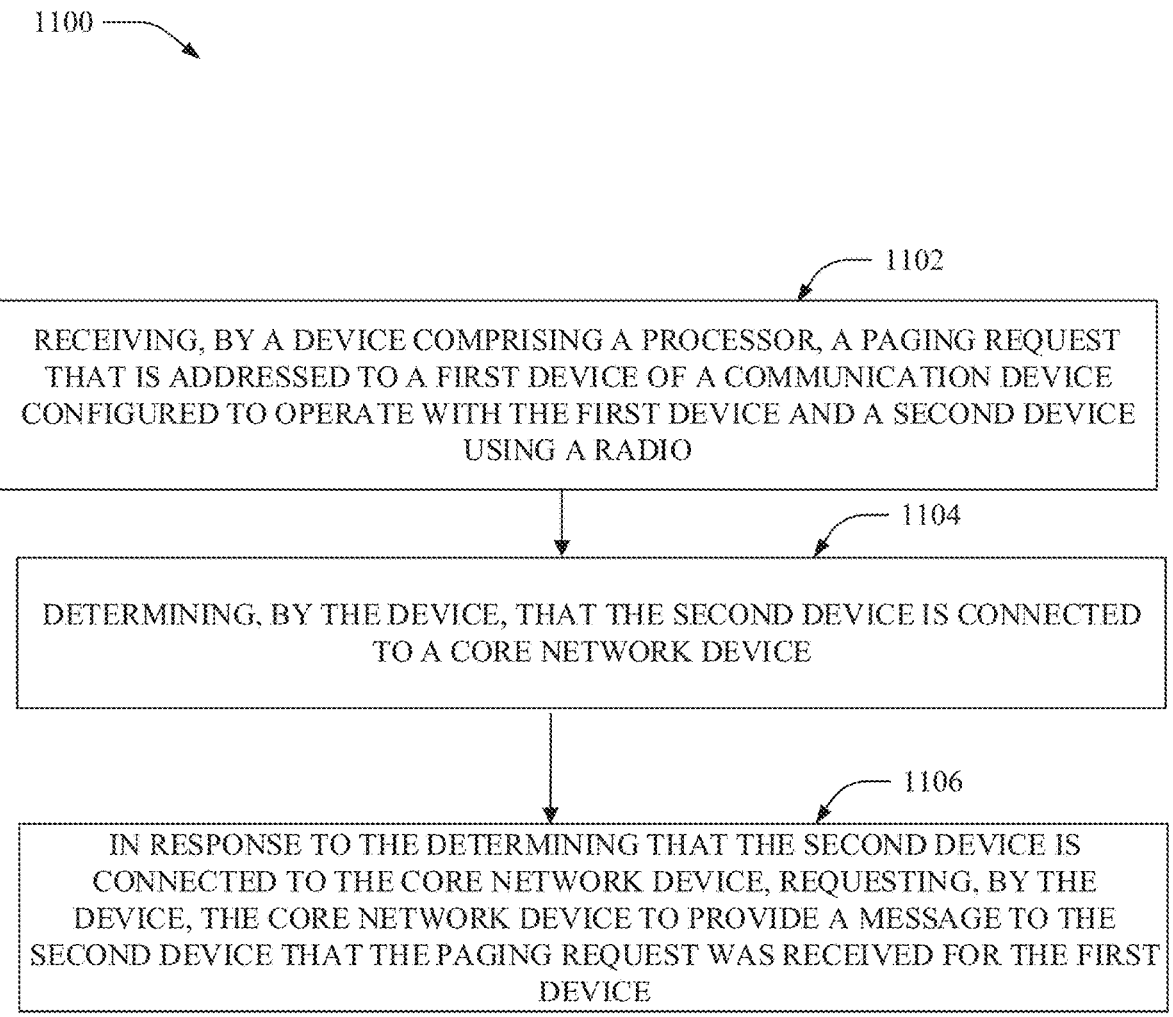
FIG. 11 depicts a diagram of an example, non-limiting computer implemented method that facilitates paging an idle subscriber identity module using a connected subscriber identity module operating in a single radio configuration in accordance with one or more embodiments described herein.

FIG. 11 depicts a diagram of an example, non-limiting computer implemented method that facilitates paging an idle subscriber identity module using a connected subscriber identity module operating in a single radio configuration in accordance with one or more embodiments described herein. In some examples, flow diagram 1100 can be implemented by operating environment 1400 described below. It can be appreciated that the operations of flow diagram 1100 can be implemented in a different order than is depicted.

In non-limiting example embodiments, a computing device (or system) (e.g., computer 1404) is provided, the device or system comprising one or more processors and one or more memories that stores executable instructions that, when executed by the one or more processors, can facilitate performance of the operations as described herein, including the non-limiting methods as illustrated in the flow diagrams of FIG. 11.

Operation 1102 depicts receiving, by a device comprising a processor, a paging request that is addressed to a first device of a communication device configured to operate with the first device and a second device using a radio. Operation 1104 depicts determining, by the device, that the second device is connected to a core network device. Operation 1106 depicts in response to the determining that the second device is connected to the core network device, requesting, by the device, the core network device to provide a message to the second device that the paging request was received for the first device.

Figure 12:
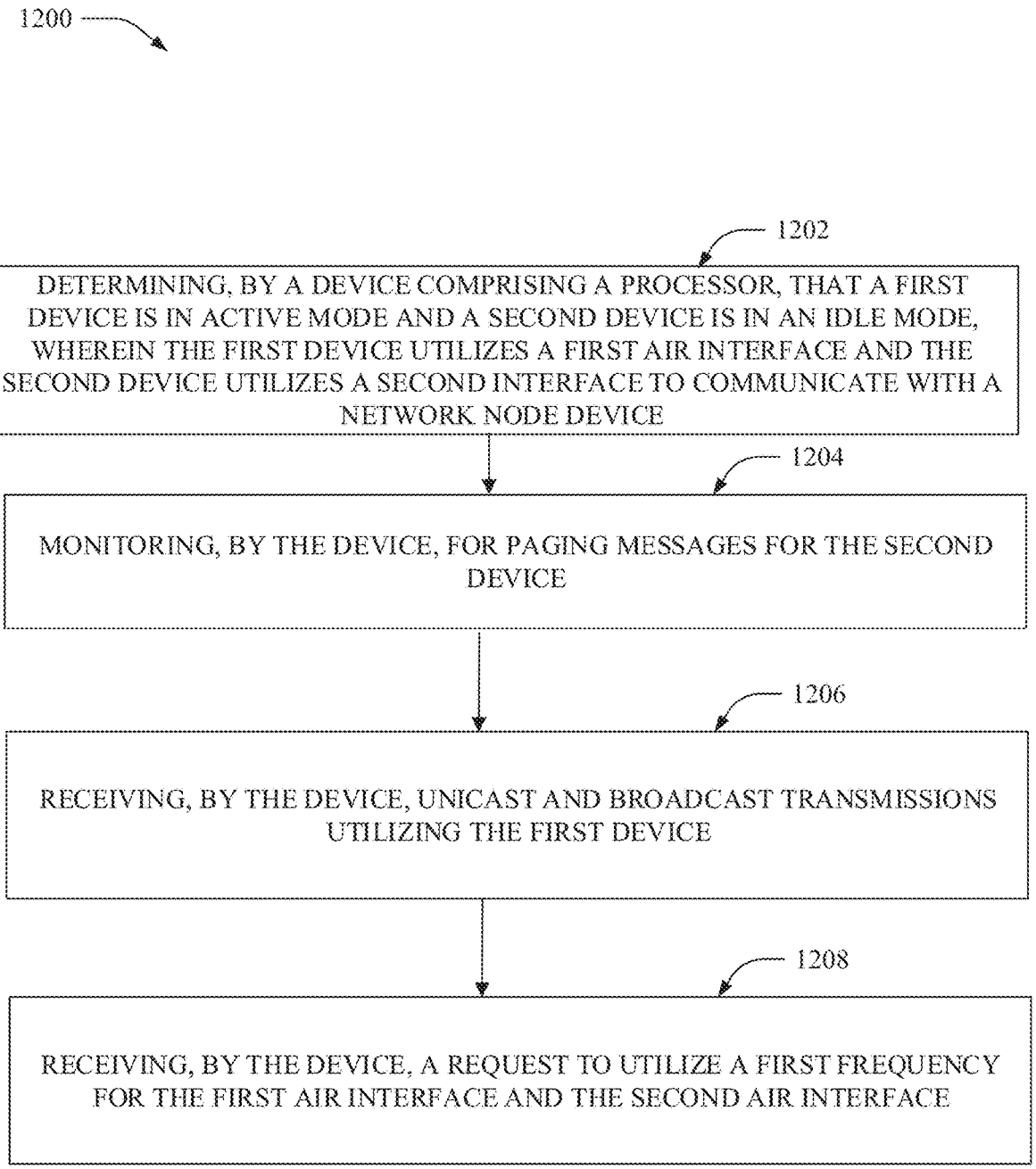
FIG. 12 depicts a diagram of an example, non-limiting computer implemented method that facilitates paging an idle subscriber identity module using a connected subscriber identity module operating in a single radio configuration in accordance with one or more embodiments described herein.

FIG. 12 depicts a diagram of an example, non-limiting computer implemented method that facilitates paging an idle subscriber identity module using a connected subscriber identity module operating in a single radio configuration in accordance with one or more embodiments described herein. In some examples, flow diagram 1200 can be implemented by operating environment 1300 described below. It can be appreciated that the operations of flow diagram 1200 can be implemented in a different order than is depicted.

In non-limiting example embodiments, a computing device (or system) (e.g., computer 1302) is provided, the device or system comprising one or more processors and one or more memories that stores executable instructions that, when executed by the one or more processors, can facilitate performance of the operations as described herein, including the non-limiting methods as illustrated in the flow diagrams of FIG. 12.

Operation 1202 depicts determining, by a device comprising a processor, that a first device is in active mode and a second device is in an idle mode, wherein the first device utilizes a first air interface and the second device utilizes a second interface to communicate with a network node device. Operation 1204 depicts monitoring, by the device, for paging messages for the second device. Operation 1206 depicts receiving, by the device, unicast and broadcast transmissions utilizing the first device. Operation 1208 depicts receiving, by the device, a request to utilize a first frequency for the first air interface and the second air interface.

Figure 13:
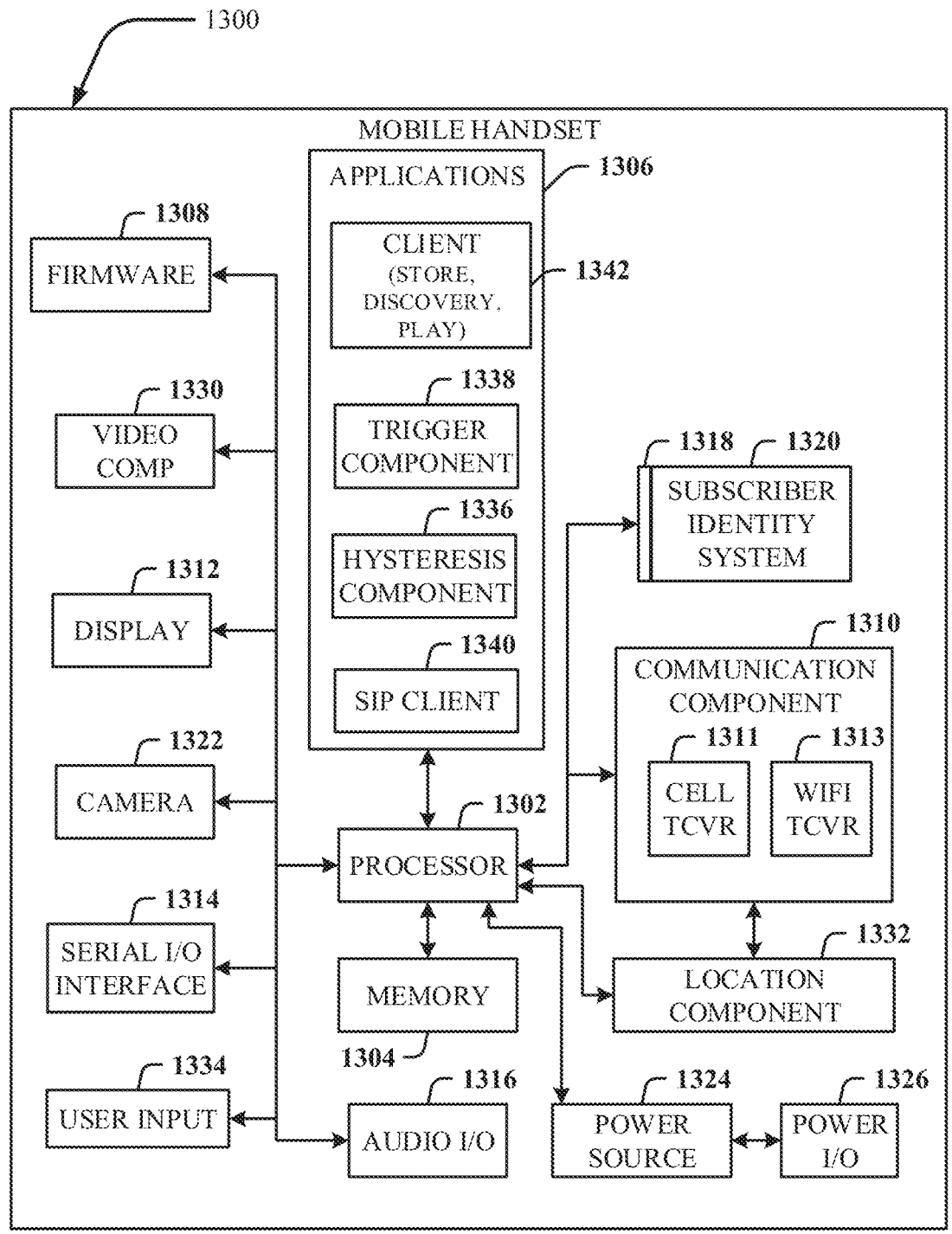
FIG. 13 illustrates an example block diagram of an example mobile handset operable to engage in a system architecture that facilitates wireless communications according to one or more embodiments described herein.

Referring now to FIG. 13, illustrated is an example block diagram of an example mobile handset 1300 operable to engage in a system architecture that facilitates wireless communications according to one or more embodiments described herein. Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset includes a processor 1302 for controlling and processing all onboard operations and functions. A memory 1304 interfaces to the processor 1302 for storage of data and one or more applications 1306 (e.g., a video player software, user feedback component software, etc.). Other applications can include voice recognition of predetermined voice commands that facilitate initiation of the user feedback signals. The applications 1306 can be stored in the memory 1304 and/or in a firmware 1308 and executed by the processor 1302 from either or both the memory 1304 or/and the firmware 1308. The firmware 1308 can also store startup code for execution in initializing the handset 1300. A communications component 1310 interfaces to the processor 1302 to facilitate wired/wireless communication with external systems, e.g., cellular networks, VoIP networks, and so on. Here, the communications component 1310 can also include a suitable cellular transceiver 1311 (e.g., a GSM transceiver) and/or an unlicensed transceiver 1313 (e.g., Wi-Fi, WiMax) for corresponding signal communications. The handset 1300 can be a device such as a cellular telephone, a PDA with mobile communications capabilities, and messaging-centric devices. The communications component 1310 also facilitates communications reception from terrestrial radio networks (e.g., broadcast), digital satellite radio networks, and Internet-based radio services networks.

The handset 1300 includes a display 1312 for displaying an indication that the paging request was received for an inactive (e.g., not connected or in idle state) device, text, images, video, telephony functions (e.g., a Caller ID function), messages indicating setup functions, and for user input. For example, the display 1312 can also be referred to as a "screen" that can accommodate the presentation of multimedia content (e.g., music metadata, messages, wallpaper, graphics, etc.). The display 1312 can also display videos and can facilitate the generation, editing and sharing of video quotes. A serial I/O interface 1314 is provided in communication with the processor 1302 to facilitate wired and/or wireless serial communications (e.g., USB, and/or IEEE 1394) through a hardwire connection, and other serial input devices (e.g., a keyboard, keypad, and mouse). This can support updating and troubleshooting the handset 1300, for example. Audio capabilities are provided with an audio I/O component 1316, which can include a speaker for the output of audio signals related to, for example, indication that the user pressed the proper key or key combination to initiate the user feedback signal. The audio I/O component 1316 also facilitates the input of audio signals through a microphone to record data and/or telephony voice data, and for inputting voice signals for telephone conversations.

The handset 1300 can include a slot interface 1318 for accommodating a SIC (Subscriber Identity Component) in the form factor of a card Subscriber Identity Module (SIM) or universal SIM 1320, and interfacing the SIM card 1320 with the processor 1302. However, it is to be appreciated that the SIM card 1320 can be manufactured into the handset 1300, and updated by downloading data and software.

The handset 1300 can process IP data traffic through the communications component 1310 to accommodate IP traffic from an IP network such as, for example, the Internet, a corporate intranet, a home network, a person area network, etc., through an ISP or broadband cable provider. Thus, VoIP traffic can be utilized by the handset 1300 and IP-based multimedia content can be received in either an encoded or decoded format.

A video processing component 1322 (e.g., a camera) can be provided for decoding encoded multimedia content. The video processing component 1322 can aid in facilitating the generation, editing, and sharing of video quotes. The handset 1300 also includes a power source 1324 in the form of batteries and/or an AC power subsystem, which power source 1324 can interface to an external power system or charging equipment (not shown) by a power I/O component 1326.

The handset 1300 can also include a video component 1330 for processing video content received and, for recording and transmitting video content. For example, the video component 1330 can facilitate the generation, editing and sharing of video quotes. A location tracking component 1332 facilitates geographically locating the handset 1300. As described hereinabove, this can occur when the user initiates the feedback signal automatically or manually. A user input component 1334 facilitates the user initiating the quality feedback signal. The user input component 1334 can also facilitate the generation, editing and sharing of video quotes. The user input component 1334 can include such conventional input device technologies such as a keypad, keyboard, mouse, stylus pen, and/or touchscreen, for example.

Referring again to the applications 1306, a hysteresis component 1336 facilitates the analysis and processing of hysteresis data, which is utilized to determine when to associate with the access point. A software trigger component 1338 can be provided that facilitates triggering of the hysteresis component 1336 when the Wi-Fi transceiver 1313 detects the beacon of the access point. A SIP client 1340 enables the handset 1300 to support SIP protocols and register the subscriber with the SIP registrar server. The applications 1306 can also include a client 1342 that provides at least the capability of discovery, play and store of multimedia content, for example, music.

The handset 1300, as indicated above related to the communications component 1310, includes an indoor network radio transceiver 1313 (e.g., Wi-Fi transceiver). This function supports the indoor radio link, such as IEEE- 802.11, for the dual-mode GSM handset 1300. The handset 1300 can accommodate at least satellite radio services through a handset that can combine wireless voice and digital radio chipsets into a single handheld device.

Figure 14:
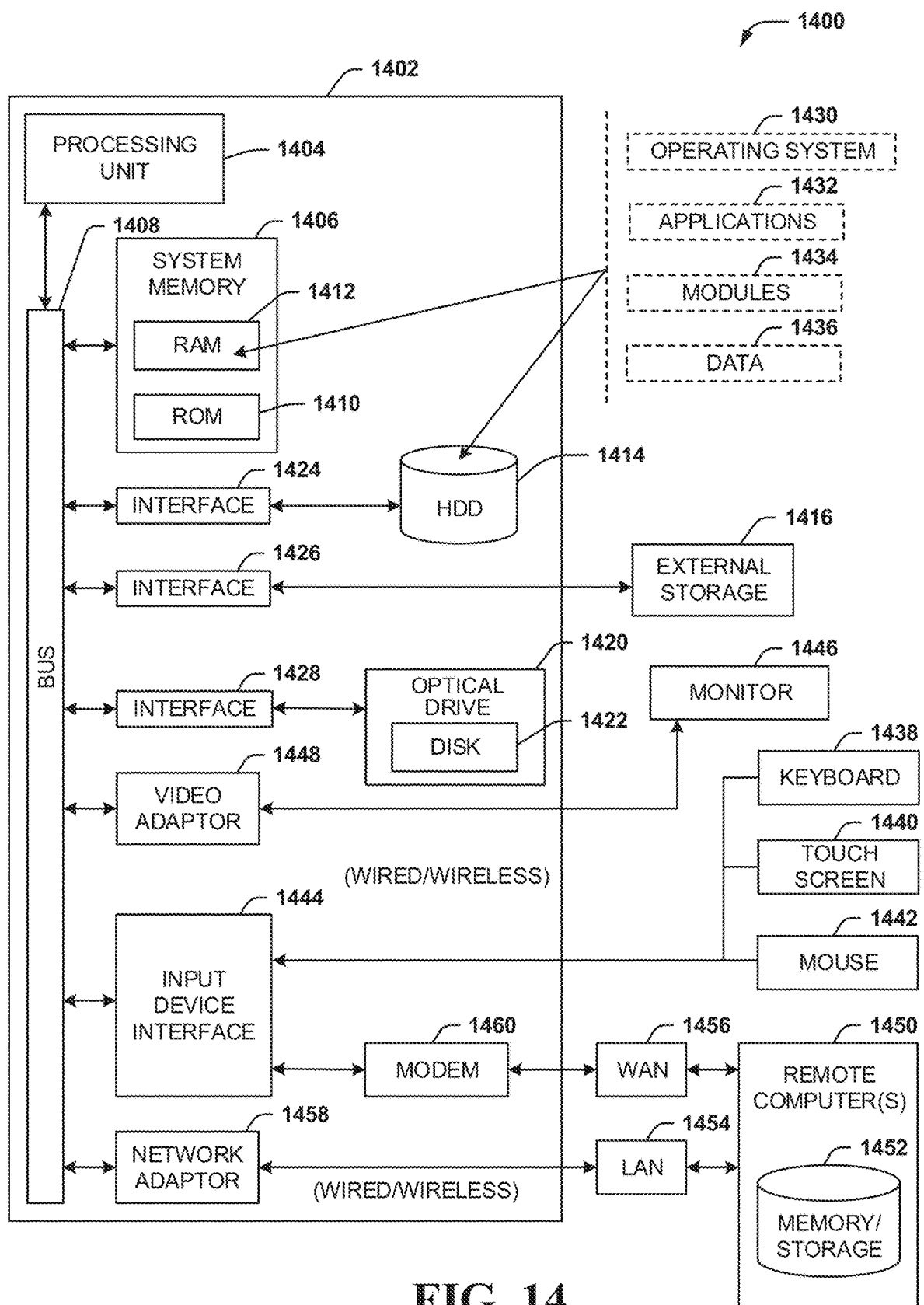
FIG. 14 illustrates an example block diagram of an example computer operable to engage in a system architecture that facilitates secure wireless communication according to one or more embodiments described herein.

Referring now to FIG. 14, illustrated is an example block diagram of an example computer 1400 operable to engage in a system architecture that facilitates wireless communications according to one or more embodiments described herein. The computer 1400 can provide networking and communication capabilities between a wired or wireless communication network and a server and/or communication device.

In order to provide additional context for various embodiments described herein, FIG. 14 and the following discussion are intended to provide a brief, general description of a suitable computing environment 1400 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 14, the example environment 1400 for implementing various embodiments of the aspects described herein includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures can also be employed as the processing unit 1404.

The system bus 1408 can be any of several types of bus structure that can further interconnect to a memory bus (with or without a memory controller), a peripheral bus, and a local bus using any of a variety of commercially available bus architectures. The system memory 1406 includes ROM 1410 and RAM 1412. A basic input/output system (BIOS) can be stored in a non-volatile memory such as ROM, erasable programmable read only memory (EPROM), EEPROM, which BIOS contains the basic routines that help to transfer information between elements within the computer 1402, such as during startup. The RAM 1412 can also include a high-speed RAM such as static RAM for caching data.

The computer 1402 further includes an internal hard disk drive (HDD) 1414 (e.g., EIDE, SATA), one or more external storage devices 1416 (e.g., a magnetic floppy disk drive (FDD) 1416, a memory stick or flash drive reader, a memory card reader, etc.) and an optical disk drive 1420 (e.g., which can read or write from a CD-ROM disc, a DVD, a BD, etc.). While the internal HDD 1414 is illustrated as located within the computer 1402, the internal HDD 1414 can also be configured for external use in a suitable chassis (not shown). Additionally, while not shown in environment 1400, a solid state drive (SSD) could be used in addition to, or in place of, an HDD 1414. The HDD 1414, external storage device(s) 1416 and optical disk drive 1420 can be connected to the system bus 1408 by an HDD interface 1424, an external storage interface 1426 and an optical drive interface 1428, respectively. The interface 1424 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1402, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. The systems and methods described herein can be implemented utilizing various commercially available operating systems or combinations of operating systems.

Computer 1402 can optionally comprise emulation technologies. For example, a hypervisor (not shown) or other intermediary can emulate a hardware environment for operating system 1430, and the emulated hardware can optionally be different from the hardware illustrated in FIG. 14. In such an embodiment, operating system 1430 can comprise one virtual machine (VM) of multiple VMs hosted at computer 1402. Furthermore, operating system 1430 can provide runtime environments, such as the Java runtime environment or the .NET framework, for applications 1432. Runtime environments are consistent execution environments that allow applications 1432 to run on any operating system that includes the runtime environment. Similarly, operating system 1430 can support containers, and applications 1432 can be in the form of containers, which are lightweight, standalone, executable packages of software that include, e.g., code, runtime, system tools, system libraries and settings for an application.

Further, computer 1402 can be enable with a security module, such as a trusted processing module (TPM). For instance with a TPM, boot components hash next in time boot components, and wait for a match of results to secured values, before loading a next boot component. This process can take place at any layer in the code execution stack of computer 1402, e.g., applied at the application execution level or at the operating system (OS) kernel level, thereby enabling security at any level of code execution.

A user can enter commands and information into the computer 1402 through one or more wired/wireless input devices, e.g., a keyboard 1438, a touch screen 1440, and a pointing device, such as a mouse 1442. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1404 through an input device interface 1444 that can be coupled to the system bus 1408, but can be connected by other interfaces, such as a parallel port, an IEEE 1394 serial port, a game port, a USB port, an IR interface, a BLUETOOTH® interface, etc.

A monitor 1446 or other type of display device can be also connected to the system bus 1408 via an interface, such as a video adapter 1448. In addition to the monitor 1446, a computer typically includes other peripheral output devices (not shown), such as speakers, printers, etc.

The computer 1402 can operate in a networked environment using logical connections via wired and/or wireless communications to one or more remote computers, such as a remote computer(s) 1450. The remote computer(s) 1450 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1452 is illustrated. The logical connections depicted include wired/wireless connectivity to a local area network (LAN) 1454 and/or larger networks, e.g., a wide area network (WAN) 1456. Such LAN and WAN networking environments are commonplace in offices and companies, and facilitate enterprise-wide computer networks, such as intranets, all of which can connect to a global communications network, e.g., the Internet.

When used in a LAN networking environment, the computer 1402 can be connected to the local network 1454 through a wired and/or wireless communication network interface or adapter 1458. The adapter 1458 can facilitate wired or wireless communication to the LAN 1454, which can also include a wireless access point (AP) disposed thereon for communicating with the adapter 1458 in a wireless mode.

When used in a WAN networking environment, the computer 1402 can include a modem 1460 or can be connected to a communications server on the WAN 1456 via other means for establishing communications over the WAN 1456, such as by way of the Internet. The modem 1460, which can be internal or external and a wired or wireless device, can be connected to the system bus 1408 via the input device interface 1444. In a networked environment, program modules depicted relative to the computer 1402 or portions thereof, can be stored in the remote memory/storage device 1452. It will be appreciated that the network connections shown are example and other means of establishing a communications link between the computers can be used.

When used in either a LAN or WAN networking environment, the computer 1402 can access cloud storage systems or other network-based storage systems in addition to, or in place of, external storage devices 1416 as described above. Generally, a connection between the computer 1402 and a cloud storage system can be established over a LAN 1454 or WAN 1456 e.g., by the adapter 1458 or modem 1460, respectively. Upon connecting the computer 1402 to an associated cloud storage system, the external storage interface 1426 can, with the aid of the adapter 1458 and/or modem 1460, manage storage provided by the cloud storage system as it would other types of external storage. For instance, the external storage interface 1426 can be configured to provide access to cloud storage sources as if those sources were physically connected to the computer 1402.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," "subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be affected across a plurality of devices. Accordingly, the description is not to be limited to any single implementation, but rather is to be construed in breadth, spirit and scope in accordance with the appended claims.

What is claimed is:

1. A core network system, comprising:
   a processor; and
   a memory that stores executable instructions that, when executed by the processor, facilitate performance of operations, comprising:
      initiating, by the core network system, a paging procedure comprising a paging request that is designated for a first device of a communication device, wherein the communication device comprises the first device and a second device;
      determining by the core network system whether the second device is in an active state; and
      in response to determining that the second device is in the active state, causing by the core network system a message to be transmitted to the second device via a carrier frequency used for communications of the second device, the message indicating that the paging request, which is designated for the first device, was initiated.

2. The core network system of claim 1, wherein the core network system comprises first core network equipment, and wherein the determining whether the second device is in the active state comprises determining whether the second device is communicatively connected to second core network equipment that is part of a second core network.

3. The core network system of claim 2, wherein causing the message to be transmitted to the second device comprises providing the message to network node equipment communicatively connected to the second device.

4. The core network system of claim 1, wherein causing the message to be transmitted to the second device comprises providing the message via core network equipment communicatively connected to the second device, and wherein the core network equipment is part of a core network comprising the core network system.

5. The core network system of claim 1, wherein the core network system comprises first core network equipment, and wherein causing the message to be transmitted to the second device comprises transmitting the paging request to second core network equipment that is servicing the second device and requesting the second core network equipment to transmit the message to the second device.

6. The core network system of claim 1, wherein the first device comprises a first subscriber identity module and the second device comprises a second subscriber identity module associated with a different identity than the first subscriber identity module.

7. The core network system of claim 1, wherein the operations further comprise:

facilitating displaying of an indication that the paging request, designated for the first device, was initiated.

8. A method, comprising:

initiating, by core network equipment comprising a processor, a paging procedure comprising a paging request that is addressed to a first device of a communication device, wherein the communication device comprises the first device and a second device;

determining, by the core network equipment, whether the second device is communicatively connected to network node equipment; and in response to the determining that the second device is communicatively connected to the network node equipment, causing, by the core network equipment, a message to be transmitted to the second device indicating that the paging request was initiated that is addressed to the first device.

9. The method of claim 8, wherein the determining whether the second device is communicatively connected to the network node equipment comprises determining whether the second device is in an active state.

10. The method of claim 9, wherein causing the message to be transmitted to the second device comprises causing the message to be transmitted to the network node equipment communicatively connected to the second device.

11. The method of claim 8, wherein the core network equipment is first core network equipment, and wherein causing the message to be transmitted to the second device comprises causing the message to be transmitted via second core network equipment communicatively connected to the second device.

12. The method of claim 8, wherein the core network equipment is first core network equipment, and wherein causing the message to be transmitted to the second device comprises transmitting the paging request to second core network equipment that is servicing the second device and requesting the second core network equipment to transmit the message to the second device.

13. The method of claim 8, wherein the first device comprises a first subscriber identity module and the second device comprises a second subscriber identity module.

14. A non-transitory machine-readable medium, comprising executable instructions that, when executed by a processor, facilitate performance of operations, comprising:

receiving, at a core network device of a core network, a paging message addressed to a first device of a communication device, wherein the communication device comprises the first device and a second device;

determining and the second device is communicatively connected to a network node device; and in response to the determining that the second device is communicatively connected to the network node device, transmitting an alert message via the core network to the second device indicating that the paging message was received, wherein the paging message is addressed to the first device.

15. The non-transitory machine-readable medium of claim 14, wherein the determining whether the second device is communicatively connected to the network node device comprises determining whether the second device is communicating with the network node device and a frequency used to establish a communication link between the second device and the network node device.

16. The non-transitory machine-readable medium of claim 14, wherein transmitting the alert message via the core network to the second device comprises transmitting the alert message, via a wired backhaul connection to the network node device that is communicatively connected to the second device.

17. The non-transitory machine-readable medium of claim 14, wherein the core network device is a first core network device, and wherein transmitting the alert message via the core network to the second device comprises transmitting the alert message via a second core network device communicatively connected to the second device.

18. The non-transitory machine-readable medium of claim 14, wherein the core network device is a first core network device, wherein the network node device is a first network node device, and wherein transmitting the alert message via the core network to the second device comprises transmitting the paging message to a second core network device that is servicing the second device and requesting the second core network device to transmit the alert message to a second network node device serving the second device.

19. The non-transitory machine-readable medium of claim 14, wherein the first device comprises a first subscriber identity module and the second device comprises a second subscriber identity module different than the first subscriber identity module.

20. The non-transitory machine-readable medium of claim 14, wherein the operations further comprise:

facilitating alerting the second device via displaying an indication that the paging message was received that was addressed to the first device.

\* \* \* \* \*